US007742082B1

(12) United States Patent
Martel

(10) Patent No.: US 7,742,082 B1
(45) Date of Patent: Jun. 22, 2010

(54) SYSTEM AND METHOD FOR INCREASING THE SENSITIVITY OF AN OPTICAL DETECTOR

(75) Inventor: Thomas Martel, Manlius, NY (US)

(73) Assignee: VY Corporation, Wayne, PA (US)

( * ) Notice: Subject to any disclaimer, the term of this patent is extended or adjusted under 35 U.S.C. 154(b) by 1256 days.

(21) Appl. No.: 11/131,449

(22) Filed: May 17, 2005

Related U.S. Application Data

(60) Provisional application No. 60/571,805, filed on May 17, 2004.

(51) Int. Cl.
*H04N 5/235* (2006.01)
(52) U.S. Cl. .................................. 348/229.1
(58) Field of Classification Search .............. 348/229.1, 348/362, 221.1, 223.1
See application file for complete search history.

(56) References Cited

U.S. PATENT DOCUMENTS

| | | | | |
|---|---|---|---|---|
| 4,983,835 A * | 1/1991 | Takeo | ................. | 250/587 |
| 5,293,255 A * | 3/1994 | Nishizawa et al. | ......... | 358/453 |
| 7,010,160 B1 * | 3/2006 | Yoshida | ................. | 348/362 |
| 7,342,609 B2 * | 3/2008 | Takizawa | ................. | 348/362 |
| 2004/0184057 A1 * | 9/2004 | Nakabayshi et al. | ......... | 358/1.9 |
| 2005/0012825 A1 * | 1/2005 | Kimber | ................. | 348/164 |

* cited by examiner

*Primary Examiner*—Nhan T Tran
(74) *Attorney, Agent, or Firm*—Connolly Bove Lodge & Hutz LLP; Arlene P. Neal

(57) ABSTRACT

A system and method of increasing the sensitivity of an optical detector formed from a two-dimensional array of sensor elements, each of said sensor elements having a dynamic range. A gradient-detection algorithm is applied to an image received from the optical detector in order to identify a shape and position of a first subset of pixels in the image. The first subset of pixels corresponds to an object represented in the image. A determination is made whether one or more of the sensor elements corresponding in shape and position to the first subset of pixels have been exposed outside of their dynamic range. If one or more sensor elements have been overexposed, at least one of the gain or offset associated with the one or more of the sensor elements is adjusted, such that the one or more sensor elements are exposed within their dynamic range. The adjustment of the gain or offset of the one or more sensor elements is performed independently of any gain or offset adjustment applied to other sensor elements in the optical detector.

13 Claims, 2 Drawing Sheets

SYSTEM AND METHOD FOR INCREASING THE SENSITIVITY OF AN OPTICAL DETECTOR

CROSS-REFERENCE TO RELATED APPLICATION

The present application claims priority to U.S. Provisional Application No. 60/571,805 entitled "Enhanced Image Gradient Discovery Method Using Intermediate and Large-Scale Order in Numeric Images," filed May 17, 2004, incorporated herein in its entirety by reference.

FIELD OF THE INVENTION

The present invention is directed to a system and method of increasing the sensitivity of an optical detector.

BACKGROUND OF THE INVENTION

The analysis of visual images by computational methods is of obvious commercial value. Visual images can be represented in the form of an array of numerical values, which values represent the luminosity of points in space. If the observed region contains physical objects, information about the position arrangement of physical objects in the observed region is encoded as numerical changes in luminosity, distributed over space and time. The individual numerical picture elements are called "pixels."

The mathematical concept of a gradient is of manifest value when applied to numerical image data. A gradient is a property of an ordered collection of numerical quantities. The ordering principle (or independent variable) can be space, or time, or some combination of these or some other organizing dimension of a conceptual framework appropriate to the phenomenon being described.

A gradient can be said to exist when numerical data undergoes some sort of change; that is to say, when the numerical value representing the data changes over time, or space, or some other independent variable. As it relates to video image data, the concept of a spatial gradient is of seminal importance. A spatial gradient of luminosity often exists along the boundaries of distinct separate physical objects that are contained within the observed region, or along the boundaries of various component parts of which these objects are composed. Such spatial gradients can be used to discover physical objects within the region observed by a video camera or other imaging instrument. The spatial extent of these objects can be discerned by resolving the set of pixels that comprise the image into a plurality of subsets wherein all the pixels within each subset correspond to, and are associated with, an identifiable physical object, or an identifiable component part of a physical object.

While it is known that spatial gradients may be used to identify the shape and position of an object in an image, optical detectors are often not configured in a manner that maximizes the capture of relevant optical information associated with the object. For example, consider an optical image of a face of building that contains a window. Spatial gradients may be used to identify an object, i.e., the window, in the image. However, if the portion of the image containing the window was shadowed by another building, the window may appear as completely dark in the image, in essence, containing no optical information. Although there may be a person at the window, the optical detector is unable to sense an image of the person because of limitations in the dynamic range of the detector elements that correspond to the window. The present invention addresses this shortcoming, by providing functionality that facilitates detection of optical information that might otherwise be outside of the dynamic range of the relevant detector elements.

SUMMARY OF THE INVENTION

The present invention is directed to a system and method of increasing the sensitivity of an optical detector formed from a two-dimensional array of sensor elements, each of said sensor elements having a dynamic range. A gradient-detection algorithm is applied to an image received from the optical detector in order to identify a shape and position of a first subset of pixels in the image. The first subset of pixels corresponds to an object represented in the image. A determination is made whether one or more of the sensor elements corresponding in shape and position to the first subset of pixels have been exposed outside of their dynamic range. If one or more sensor elements have been overexposed, at least one of the gain or offset associated with the one or more of the sensor elements is adjusted, such that the one or more sensor elements are exposed within their dynamic range. The adjustment of the gain or offset of the one or more sensor elements is performed independently of any gain or offset adjustment applied to other sensor elements in the optical detector.

DETAILED DESCRIPTION OF THE PREFERRED EMBODIMENTS

Figure 1:
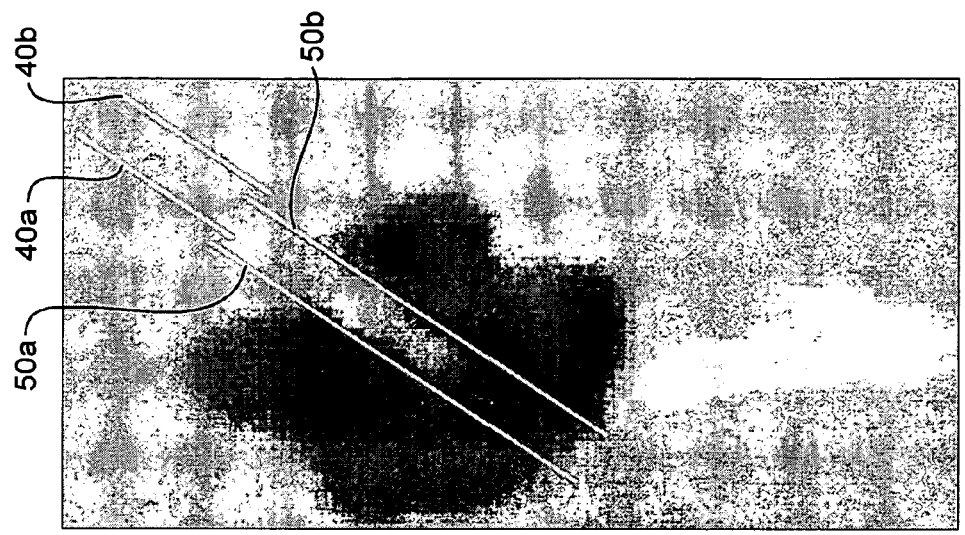
FIG. 1 represents an image of a human being holding a weapon.

FIG. 1 represents an image of a human 10 holding a weapon 20. The weapon 20, which is essentially a long cylindrical pipe, appears as an elongated region in the image. Part of weapon 20 extends above the figure of human 10; the balance of the pixels which correspond to weapon 20 are superimposed upon, and surrounded by, pixels corresponding to the torso 30 of human 20.

Figure 2:
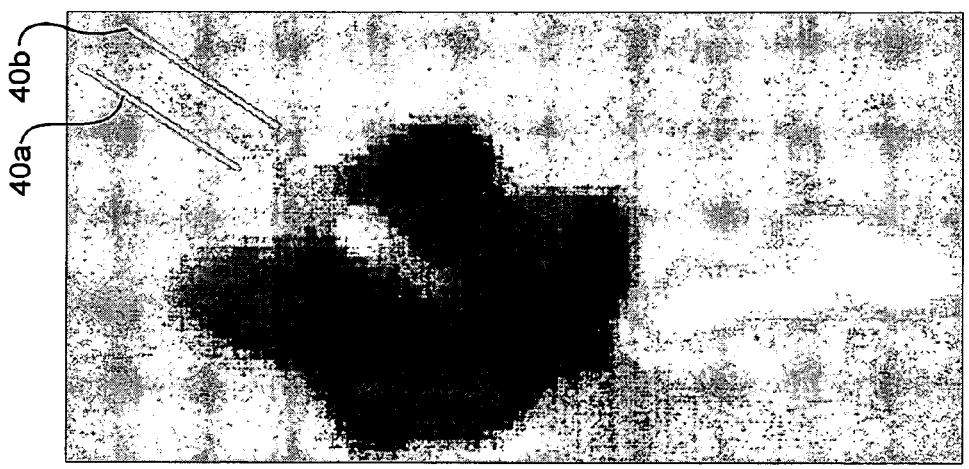
FIG. 2 depicts the image of FIG. 1, with the addition of two line segments that were discovered by a machine vision algorithm.

FIG. 2 depicts the image of FIG. 1, with the addition of two line segments 40a, 40b that were discovered by a machine vision algorithm. In the embodiment shown, segments 40a, 40b were discovered through detection of gradients along the edges of the part of weapon 20 that extends above the figure of human 10.

Figure 3:
FIG. 3 depicts the image of FIG. 2, with the addition of two new line segments having the same slope (angle) as the line segments that were discovered by the machine vision algorithm.

FIG. 3 depicts the image of FIG. 2, with the addition of two new line segments 50a, 50b having the same slope (angle) as line segments 40a, 40b that were discovered by the machine vision algorithm. Line segments 50a, 50b have been displaced slightly from the two machine-discovered line segments 40a, 40b because differences in illumination and contrast in the image of weapon 20 where that image is superimposed on the torso 30 of the human 10 has caused an apparent displacement in the true boundaries of weapon 20. However, even though the boundaries have been displaced slightly, the apparent angle of presentation of the weapon body tube has not changed. The angle is the same for the segments of weapon 20 superimposed over the torso 30 of human 10 as for the segments that extend above the figure of human 10.

Figure 4B:
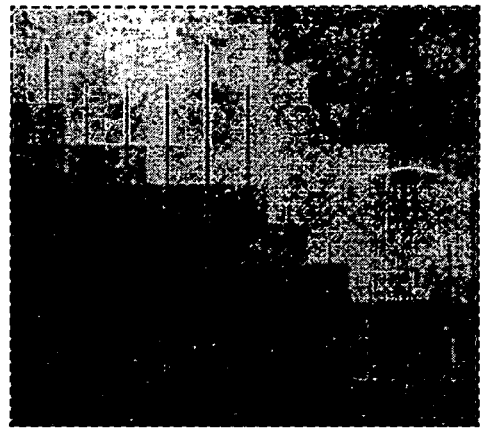
FIG. 4B a magnified detail region of FIG. 4A, that has been augmented with a depiction of the gradient data for the actual image.
Figure 4A:
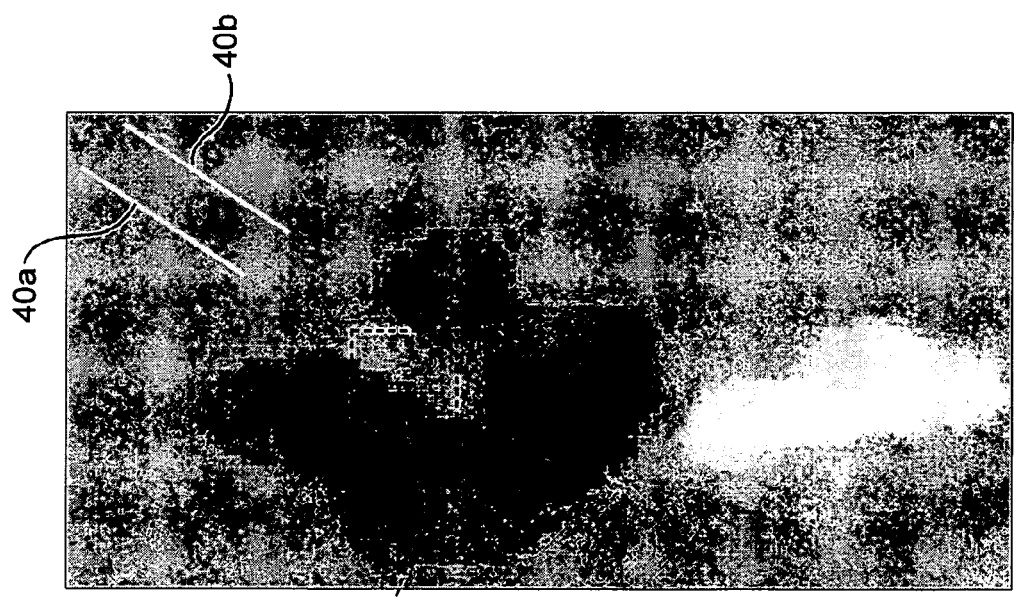
FIG. 4A shows a magnified view of a small region of the image of the weapon tube where it is superimposed over the torso of the human figure.

In FIG. 4A, we show a magnified view of a small region of the image of the weapon tube where it is superimposed over torso 30 of the human figure. In FIG. 4B, the magnified detail region has been augmented with a depiction of the gradient data for the actual image. These gradients are represented by a square, which is the size of one single pixel, from which a horizontal line segment proceeds from left to right. The square represents the location of the first pixel for which the luminosity differs by an amount greater than a certain threshold value from that of the pixel immediately to its left. In this case, the threshold amount has been set to a value of two "counts," where the total dynamic range of the image data is 256 counts.

The horizontal line extending out of the "threshold pixel" from left to right indicates the extent of the gradient interval (or gradient run) of pixels. The endpoint of this line indicates the location of the last, or right-most, pixel for which the luminosity is still increasing. Thus, the horizontal extent of this line segment indicates the bounds of a horizontally-arranged group of pixels for which the luminosity is "monotone increasing," or increasing without interruption and without regard to the numerical degree of increase.

The two lines that were discovered by a machine-vision algorithm, and which are shown in FIG. 2 (and repeated in FIG. 3 and FIG. 4) were discovered by that algorithm on the basis of the good ordering of threshold pixels along a linear boundary. The reader will note that the locations of the threshold pixels in the torso detail region of FIG. 4B fall only imperfectly along a line. These imperfections are due to disturbances in background and illumination characteristics resulting from the presence of the torso of the human figure.

In one embodiment, a gradient detection algorithm such as the one described above is applied to an image received from the optical detector (e.g., a CCD array or other optical detector formed from a two-dimensional array of sensor elements) in order to identify a shape and position of a first subset of pixels in the image. The first subset of pixels corresponds to an object represented in the image (e.g., the weapon 20 represented in the above-described Figures). A determination is made whether one or more of the sensor elements corresponding in shape and position to the first subset of pixels have been exposed outside of their dynamic range. In one embodiment, the determination is performed by determining whether luminosity values of pixels in the first subset are at or near the edge of the dynamic range of the sensor elements. If one or more sensor elements in the first subset have been overexposed (or underexposed), at least one of the gain or offset associated with the one or more of the sensor elements is adjusted, such that the one or more sensor elements are exposed within their dynamic range. The adjustment of the gain or offset of the one or more sensor elements is performed independently of any gain or offset adjustment applied to other sensor elements in the optical detector. Thus, in connection with the example of the above-described figures, the dynamic range of the detector elements corresponding to the weapon 20 would be adjusted independently of the other detector elements associated with the image.

The functionality for identifying the shape and position of the first subset of pixels in the image, determining whether one or more of the sensor elements corresponding in shape and position to the first subset of pixels have been exposed outside of their dynamic range, and the adjustment of the gain and/or or offset associated with the one or more of the sensor elements, is performed by a processor coupled to (or integrated with) the optical detector. In one embodiment, the optical detector includes circuitry that permits the processor to address and control the gain and/or offset associated with each pixel independently of the gain and/or offset associated with other pixels in the detector. Alternatively, the optical detector may include circuitry that permits the processor to address and control the gain and/or offset associated with each of a plurality of regions of pixels independently of the gain and/or offset associated with other regions of pixels in the detector.

Finally, it will be appreciated by those skilled in the art that changes could be made to the embodiments described above without departing from the broad inventive concept thereof. It is understood, therefore, that this invention is not limited to the particular embodiments disclosed, but is intended to cover modifications within the spirit and scope of the present invention as defined in the appended claims.

What is claimed is:

1. A method of increasing the sensitivity of an optical detector formed from a two-dimensional array of sensor elements, each of said sensor elements having a dynamic range, said method comprising:

applying a gradient-detection algorithm to an image received from the optical detector in order to identify a shape and position of a first subset of pixels which correspond to a shape represented in the image, said shape represented in the image being in the foreground over at least one other object in the image or the at least one other object being in the foreground over said shape;

determining whether one or more of the sensor elements corresponding in shape and position to the first subset of pixels have been exposed outside of said dynamic range; and if said one or more sensor elements have been overexposed, adjusting at least one of a gain or offset associated with said one or more of the sensor elements, such that said one or more sensor elements are exposed within said dynamic range;

wherein said adjustment of the gain or offset of said one or more sensor elements is performed independently of any gain or offset adjustment applied to other sensor elements in the optical detector.

2. The method of claim 1, wherein a region of the image is magnified and a magnified region is augmented with a depiction of gradient data for the image.

3. The method of claim 2, wherein the each gradient is represented by a square equivalent to the size of a pixel, wherein a horizontal line segment proceeds from the gradient data from left to right.

4. The method of claim 3, wherein the square represents a location of a first pixel for which the luminosity differs by an amount greater than a certain threshold value from that of a pixel immediately to the left of the first pixel.

5. The method of claim 4, wherein the threshold value is set to a value of two counts and wherein a total dynamic range of image data is 256 counts.

6. The method of claim 3, wherein the horizontal line extending out of threshold pixel indicates an extent of a gradient interval of pixels, wherein a rightmost endpoint of the horizontal line indicates a location of a rightmost pixel for which the luminosity is still increasing.

7. The method of claim 1, wherein the determining comprises determining whether luminosity values of pixels in the first subset of pixels are at or near an edge of the dynamic range of the sensor elements.

8. The method of claim 1, wherein the shape represented in the image corresponds to another object represented in the image.

9. The method of claim 1, wherein the shape represented in the image comprises a plurality of shapes, wherein the plurality of shapes correspond to another object represented in the image.

10. The method of claim 1, wherein the shape represented in the image comprises a plurality of shapes represented in the image, wherein the plurality of shapes correspond to a plurality of objects represented in the image.

11. The method of claim 1, wherein the image represents a building, the shape corresponds to a window in the image, and the object corresponds to a figure in the window.

12. A system of increasing the sensitivity of an optical detector formed from a two-dimensional array of sensor elements, each of said sensor elements having a dynamic range, comprising:

a processor to apply a gradient-detection algorithm to an image received from the optical detector in order to identify a shape and position of a first subset of pixels which correspond to a shape represented in the image, said shape represented in the image being in the foreground over at least one other object in the image or the at least one other object being in the foreground over said shape;

wherein the processor is to determine whether one or more of the sensor elements corresponding in shape and position to the first subset of pixels have been exposed outside of said dynamic range; and if said one or more sensor elements have been overexposed, the processor to adjust at least one of a gain or offset associated with said one or more of the sensor elements, such that said one or more sensor elements are exposed within said dynamic range;

wherein said adjustment of the gain or offset of said one or more sensor elements is performed independently of any gain or offset adjustment applied to other sensor elements in the optical detector.

13. An apparatus for increasing the sensitivity of an optical detector formed from a two-dimensional array of sensor elements, each of said sensor elements having a dynamic range, comprising:

applying means for applying a gradient-detection algorithm to an image received from the optical detector in order to identify a shape and position of a first subset of pixels which correspond to a shape represented in the image, said shape represented in the image being in the foreground over at least one other object in the image or the at least one other object being in the foreground over said shape;

determining means for determining whether one or more of the sensor elements corresponding in shape and position to the first subset of pixels have been exposed outside of said dynamic range; and if said one or more sensor elements have been overexposed, adjusting means for adjusting at least one of a gain or offset associated with said one or more of the sensor elements, such that said one or more sensor elements are exposed within said dynamic range;

wherein said adjustment of the gain or offset of said one or more sensor elements is performed independently of any gain or offset adjustment applied to other sensor elements in the optical detector.

* * * * *